United States Patent [19]

Bromley et al.

[11] Patent Number: 4,673,703

[45] Date of Patent: Jun. 16, 1987

[54] COATING COMPOSITIONS

[75] Inventors: Charles W. A. Bromley, Bourne End; Jonathan A. Graystone, Maidenhead, both of England

[73] Assignee: Imperial Chemical Industries PLC, London, England

[21] Appl. No.: 758,205

[22] Filed: Jul. 23, 1985

[30] Foreign Application Priority Data

Aug. 6, 1984 [GB] United Kingdom ................. 8420005

[51] Int. Cl.[4] ............................................. C08L 51/00
[52] U.S. Cl. .................................... 524/504; 524/556; 524/558; 524/560; 524/564
[58] Field of Search ............... 524/504, 556, 558, 560, 524/564, 571

[56] References Cited

U.S. PATENT DOCUMENTS

| | | | |
|---|---|---|---|
| 3,095,388 | 6/1963 | Osmond et al. | 524/560 |
| 3,317,635 | 5/1967 | Osmond et al. | 525/296 |
| 3,514,500 | 5/1970 | Osmond et al. | 526/202 |
| 3,607,821 | 9/1971 | Clarke et al. | 524/529 |
| 4,206,099 | 6/1980 | Bentley et al. | 528/295.5 |
| 4,294,735 | 10/1981 | Bentley et al. | 524/504 |

Primary Examiner—Paul R. Michl
Assistant Examiner—Alex H. Walker
Attorney, Agent, or Firm—Cushman, Darby & Cushman

[57] ABSTRACT

A coating composition which is especially suitable for producing decorative coatings upon wood substrates comprises, as at least 51% by weight of the film-forming material present, a sterically stabilized dispersion in a volatile organic liquid of insoluble vinyl or acrylic polymer particles, the polymer having an extensibility of 50–2000% and being crosslinked to such an extent that it has a gel content of at least 35% by weight.

14 Claims, No Drawings

COATING COMPOSITIONS

This invention relates to coating compositions which are of especial interest for the decorative paint market and in which the film-forming material consists wholly or predominantly of sterically stabilised, crosslinked polymer particles.

By "decorative paint" is meant herein a coating composition which is mainly intended to be applied in situ to buildings such as houses, schools, hospitals and industrial premises, or to the fitments associated with such buildings, both externally and internally. A characteristic of a coating for the decorative market is its ability to form a durable protective film under conditions of ambient temperature and humidity. It is thereby contrasted with those paints or finishes which are cured by a heat-initiated crosslinking reaction and which therefore have to be applied under factory conditions to produce a fully cured film. However, decorative paints as thus defined may also be applied in the factory to pre-fabricated components intended for subsequent installation in a building, such as door and window frames or decorative cladding panels.

Two main types of decorative paint are well recognised. One type is generally referred to as "water-borne", the other as "solvent-borne". These descriptions refer rather loosely to the composition of the continuous phase liquid in which the film-forming material is carried; water-borne paints utilise a continuous phase consisting largely of water, although minor amounts of water-miscible organic solvents may also be present, whilst in solvent-borne paints the continuous phase is usually a hydrocarbon liquid of the white spirit type. There are further differences between the two types which are of equal or greater significance than the nature of the carrier liquid. The majority of water-borne paints are aqueous dispersions of thermoplastic acrylic or vinyl resins (as a consequence of which they are often referred to as emulsion paints), and film formation takes place by evaporation of the water phase and subsequent coalescence of the polymer particles, without the occurrence of crosslinking or any other chemical changes to the polymer. In contrast, the majority of solvent-borne paints are solutions in hydrocarbon of oils or alkyd resins, and film formation results from evaporation of the solvent followed by autoxidative crosslinking of the solute material. The autoxidation process continues long after the film has first formed and may eventually lead to embrittlement of the film due to excessive crosslinking. In general, therefore, it can be said that the binder in a water-borne paint is typically a high molecular weight, thermoplastic resin, whereas that in a solvent-borne paint is typically a low molecular weight oligomer or polymer capable of becoming crosslinked by autoxidation. Owing to these differences in the nature of both the continuous phase liquid and the binder, and the fact that the one type is a dispersion and the other is a solution, the rheological properties of the two types of decorative paint are also rather dissimilar. One can further distinguish between the two types in terms of their application characteristics. Water-borne compositions are in general quick-drying, easy to apply and have no after-odour, and the resulting films are non-yellowing and permanently flexible; however, they have poor early water-resistance and inferior flow properties, and can suffer from blocking and dirt pick-up. Solvent-borne compositions are usually relatively slow-drying and suffer from afterodours, yellowing and embrittlement, but they have good early water-resistance, good flow and are less prone to blocking and dirt pick-up. Water-borne paints are non-flammable and non-toxic, but they can cause rusting of ferrous fitments to which they are applied. Solvent-borne paints are free from this last defect, but are usually flammable and may present a toxicity problem when used in confined situations.

There are thus many different factors to be taken into account in choosing between a water-borne paint and a solvent-borne paint for a particular enduse. Neither type has over-riding advantages in every situation, and consequently both types are to be found in all the major world decorative markets.

There exists a third type of coating composition which hitherto has not found any significant application in the decorative market. It is somewhat intermediate in nature between the two types discussed above, and consists of a dispersion of particles of polymer somewhat similar to those in a water-borne coating but dispersed in a hydrocarbon liquid instead of in water. The particles are stabilised in dispersion by a steric mechanism, as contrasted with the charge stabilisation mechanism which operates in water-borne dispersions. The background to, and principles of, the technology of non-aqueous polymer dispersions (NAD's) is fully treated in the book "Dispersion Polymerisation in Non-Aqueous Media", edited by K. E. J. Barrett (John Wiley, 1975). Coating compositions of the NAD type have found extensive use in the automotive market and, to a lesser extent, in the industrial market. However, although there have been proposals to use such compositions in the decorative market, these have not led to commercial success. There are several reasons for this, but one of particular significance is the failure of the derived films to show adequate adhesion to wood substrates, to which decorative paints are so often required to be applied. There have been described, in British Patent Specifications Nos. 1,594,123 and 1,599,045, coating compositions in which the film-forming material consists in part of polymer particles of colloidal dimensions which are stably dispersed by a steric mechanism in a non-aqueous, non-solvent liquid continuous phase, the continuous phase being capable per se of curing to a film-forming polymer, which thus constitutes a matrix within which the polymer particles remain dispersed as discrete entities. The continuous phase is provided mainly by an oligomer or low polymer capable of curing by an autoxidative mechanism. The formulations in question are, however, proposed as a means of attaining abnormally high film-forming solids contents without the penalty of high composition viscosities. The disperse polymer particles are merely required to be insoluble in the liquid continuous phase and are not more specifically defined as to physical characteristics.

We have now found that sterically stabilised non-aqueous dispersions of polymer particles of certain specified characteristics are very suitable as a basis for formulating decorative paints in which the disperse phase polymer constitutes either the whole or the greater part of the film-forming material.

According to the present invention we provide a coating composition in which at least 51% by weight of the film-forming material is present as a sterically stabilised dispersion in a volatile organic liquid of particles of colloidal dimensions of an acrylic or vinyl polymer which is insoluble in that liquid, the polymer having an extensibility as hereinafter defined in the range 50–2000% and being crosslinked to an extent such that the disperse phase has a gel content as hereinafter defined of at least 35% by weight.

By "colloidal dimensions" we mean that the particles of the disperse phase have an average diameter lying in the range 0.1–10 μm.

We define "extensibility" of the disperse phase polymer as being the percentage increase in length which a film of specified dimensions is able to undergo up to the point of rupture at 25° C., as determined according to the procedure of A.S.T.M. D2370-68. Preferably, the polymer has an extensibility in the range 100 to 1000%.

By "gel content" we mean the proportion which is present, in the total polymer of the disperse phase, of material which is insoluble in organic solvents. A satisfactory method of determining the gel content is as follows. The dispersion of the polymer particles in the chosen organic liquid, obtained as described below, is diluted with tetrahydrofuran in a weight proportion of 1:20 and is then shaken for 30 minutes. The resulting suspension is centrifuged, the supernatant liquid discarded and the residual insoluble polymer dried at 150° C. for 30 minutes. The weight of the insoluble polymer is then compared with that of the disperse phase originally taken.

Preferably, the gel content of the polymer is at least 50% by weight.

Acrylic or vinyl polymers suitable for use according to the invention are those derived from monomers containing the grouping $CH_2\!\!=\!\!C\!<$. These include esters of acrylic and methacrylic acid, such as ethyl acrylate, butyl acrylate, 2-ethylhexyl acrylate, methyl methacrylate, butyl methacrylate, benzyl methacrylate, 2-hydroxyethyl acrylate, 2-hydroxyethyl methacrylate, and 2-hydroxypropyl methacrylate, as well as acrylic acid and methacrylic acid themselves, other derivatives of those acids such as acrylonitrile, methacrylonitrile, acrylamide and methacrylamide, vinyl esters of organic and inorganic acids such as vinyl acetate, vinyl propionate, vinyl chloride and vinylidene chloride, vinyl aromatic compounds such as styrene and vinyltoluene, and hydrocarbon monomers such as isoprene and butadiene.

The disperse pplymer may be derived either from a single monomer or from a mixture of two or more monomers, as desired. In general, the monomer(s) will be chosen in such a way that the derived polymer meets the extensibility requirement previously stated. The choice may be made in accordance with principles which are well known in the polymer art, recognising that "hard" monomers such as methyl methacrylate give rise to homopolymers of relatively low extensibility and, conversely, "soft" monomers such as ethyl acrylate give rise to homopolymers of relatively high extens- ibility.

As already indicated, it is a further essential feature of the invention that the polymer particles be crosslinked to a degree such that the disperse phase has a minimum gel content previously defined. Ways of achieving such crosslinking are commonly known in the art, one of the more frequently used of these being the inclusion in the monomers, from which the polymer is to be formed, of a proportion of a monomer which is difunctional or polyfunctional with respect to the polymerisation reaction. The level of gel content prescribed according to the present invention is, however, relatively high and we have found that with some crosslinking monomers it cannot be attained without difficulties being encountered in producing polymer particles having the necessary degree of steric stability in dispersion. It will be understood that the gel content of the disperse phase will depend not only on the proportion of the crosslinking monomer employed but also on the specific nature of that monomer. We have not found it possible to differentiate clearly, in terms of chemical composition, those crosslinking monomers which are satisfactory for use according to the invention and those which are not, but it is a matter of simple trial and error to determine whether any chosen crosslinking monomer is capable of being used in a proportion sufficient for the required gel content to be reached without the intrusion of problems of particle stability. For guidance, it can be stated that crosslinking monomers which we have found to be satisfactory include allyl methacrylate, trimethylolpropane triacrylate (as available commercially under the name "Sartomer" SR 351 : "Sartomer" is a Registered Trade Mark), diallyl phthalate and the aromatic diacrylate of bisphenol A and available commercially under the name "Photomer" 4028 : "Photomer" is a Registered Trade Mark). Crosslinking monomers which we have not been able to use satisfactorily include ethylene glycol dimethacrylate and divinylbenzene.

Another commonly employed method of achieving crosslinking of acrylic or vinyl polymers is by the incorporation in the monomers, from which the polymer is to be formed, of a pair of monomers carrying functional groups which are mutually co-reactive. An example of such an approach is the use together of an epoxide group-containing monomer and a carboxyl group-containing monomer, such as glycidyl (meth)acrylate and (meth)acrylic acid.

The nature and proportion of the chosen crosslinking monomer may influence to some extent the extensibility of the resulting polymer and some adjustment of the choice of main monomers, as discussed above, may be necessary in order to allow for this effect. In all cases, however, the devising of a monomer formulation meeting the requirements of gel content, extensibility and stability of the disperse phase is a matter of simple experimentation.

The organic liquid of the dispersion is, as already indicated, one which is a non-solvent for the polymer particles. For the dispersion to be a satisfactory basis for a decorative paint, the liquid should also be sufficiently volatile to evaporate reasonably quickly at ambient temperatures. Particularly suitable organic liquids are the aliphatic, or predominantly aliphatic, hydrocarbons such as hexane, heptane and petroleum fractions of various boiling point ranges; the latter may have some content of aromatic material, but odour and/or toxicity considerations require that this should be kept to a minimum and, if possible, avoided altogether by the use of hydrogenated petroleum distillates. The organic liquid may if desired include minor proportions of polar solvents, such as ethanol, isopropanol or tert-butanol.

In order to produce the required sterically stabilised polymer dispersion, the chosen monomers are polymerised, in the organic liquid in which the dispersion is to be formed, following the principles which are well established for non-aqueous dispersion polymerisation processes and are extensively described in the patent and technical literature, for example in the book "Dispersion Polymerisation in Non-Aqueous Media" already referred to. Essential features of such processes are the ability of the dispersion liquid to dissolve the monomers being polymerised (but not the resulting polymer), and the presence in the polymerisation mixture of a steric stabiliser whereby the polymer particles are prevented from flocculating as they form and separate from the continuous phase. The first of these requirements is already met, so far as the great majority of acrylic or vinyl monomers are concerned, by aliphatic hydrocarbon liquids. The second requirement calls for the presence of an amphipathic polymeric substance one molecular component of which is solvatable by the organic liquid of the dispersion and another component of which is relatively non-solvatable by that liquid and is capable of associating with the polymer particles produced. A preferred form of stabiliser in the present case is a graft copolymer comprising a polymer backbone, which is the non-solvatable or "anchor" component, and a plurality of solvatable polymer chains pendant from the backbone. Specific examples of such graft copolymers include those in which the backbone is an acrylic polymer chain, derived predominantly from methyl methacrylate, and the pendant chains are residues of poly(12-hydroxystearic acid) which are readily solvatable by an aliphatic hydrocarbon medium. These copolymers may be made, for example, by first reacting poly(12-hydroxystearic acid) with glycidyl acrylate or glycidyl methacrylate, whereby the terminal —COOH group in the polymeric acid is converted to an ester derivative containing a polymerisable unsaturated grouping, and then copolymerising that derivative with methyl methacrylate and optionally minor proportions of other copolymerisable monomers. Further details concerning copolymer stabilisers of this type are given in British Patent Specification No. 1,122,397.

Alternatively, again following the procedures which are well known to those skilled in the art, the copolymer stabiliser may be formed in situ from a suitable precursor which is added to the monomers being polymerised to form the dispersion and with which a minor proportion of those monomers are able to copolymerise. An example of such a precursor is the adduct of poly(12-hydroxystearic acid) with glycidyl methacrylate referred to above.

The polymerisation of the monomers is assisted in conventional fashion by the presence of free radicaltype initiators, for example monomer-soluble azonitriles, azoesters, peroxides, peroxydicarbonates and hydroperoxides. Polymerisation is conveniently carried out at the temperature of reflux of the organic dispersion liquid. Chain transfer agents, such as mercaptans, may be added in order to regulate the molecular weight of the resulting polymer.

The polymerisation may if desired be performed by a "one-shot" technique, in which the whole of the monomer charge to be polymerised, together with the stabiliser or stabiliser precursor, initiator, chain transfer agent and other necessary ingredients are introduced into the dispersion liquid and heated. Preferably, however, a "seed-and-feed" procedure is employed, in which only a small proportion of the charge of monomers, etc. is added initially to the dispersion liquid and is polymerised to form a fine "seed" dispersion of polymer particles, following which the remainder of the charge is gradually fed into the continually re-cycling dispersion liquid.

The above-mentioned requirement that the polymer particles should be of colloidal size, viz. in the range 0.1-10 μm is normally met when the particles have been produced by a process of non-aqueous dispersion polymerisation as described, particularly if the "seed-and-feed" procedure is followed. The factors controlling particle size and distribution, such as monomer composition, solvency of the dispersion and level of stabiliser, are in any event fully discussed in the literature source referred to above.

The disperse phase of the dispersions may, if desired, be arranged to contain autoxidisable groups. This can be achieved by including, in the monomers being polymerised, comonomers containing such groups,for example dicyclopentenyloxyethyl methacrylate or trimethylolpropane diallyl ether monomethacrylate. Alternatively, a pre-formed autoxidisable polymer may be added to the mixture of monomers. A suitable such polymer is, for example, the adduct of soya bean oil fatty acid with glycidyl methacrylate. Autoxidisable groupings are preferably present in a proportion of from 2% to 20% by weight of the disperse phase of the dispersion.

The solids contents of the polymer dispersions may vary considerably, but will normally lie in the range 40% to 70%, preferably 55% to 65%, by weight.

Coating compositions according to the invention are obtained by incorporating into the sterically stabilised polymer dispersion, as above described, any of the conventional paint additives such as diluents, thickeners, pigments, dyes, fillers, fungicides and flow control agents. In an extreme case, a non-pigmented coating composition may be prepared essentially by addition to the dispersion of further volatile organic diluent so as to bring the solids content down to a suitable level for application to a substrate; minor amounts of a thickener, a dye and a flow control agent may also be added. Usually, however, a pigment will be introduced and it will then be necessary to employ a pigment dispersing agent of the type normally used in solvent-borne systems. Any other constituents added will likewise be of the types which are conventional in such systems.

The coating compositions may optionally contain, in addition to the dispersed, crosslinked polymer, a film-forming polymer or resin which is soluble in the volatile organic liquid. Such additional film-former may constitute up to a maximum of 49% by weight of the total film-forming material present. The chief reason for incorporating such a constituent is the enhancement of the viscosity of the composition in order to improve its application characteristics in those instances where the typically low viscosities of NAD's may be considered undesirable. The benefits of the invention are, however, more fully realised the higher the proportion of dispersed polymer present, and in general the added film-former preferably does not exceed 25% by weight of the total. An example of a suitable additional film-former is a conventional alkyd resin. In the case where the disperse polymer contains autoxidisable groups, the alkyd resin may with advantage be itself of the air-drying type.

We have found that the properties of the coating compositions are improved if they include a metal-containing compound, in particular a compound of cobalt such as is conventionally employed as a drier in autoxidative-curing, solvent-borne paints. Examples of such compounds include cobalt naphthenate and cobalt octoate. In those cases where the coating compositions of the invention contain autoxidisable groups, it is perhaps not unexpected that the presence of a metallic drier brings about an improvement in film properties, but we find that the improvement surprisingly exists even where groupings recognised as being typically autoxidisable are completely absent.

The coating compositions of the invention are very suitable for the various types of end-use embraced by the decorative market. They combine the quick-drying, easy application and flexible film characteristics of a water-borne composition with the early water-resistance typical of solvent-borne coatings. They are particularly attractive for use on wood substrates where, in contrast to water-borne compositions, they do not cause grain-raising and, in contrast to conventional solvent-borne compositions, they provide films which maintain their flexibility and so can accommodate moisture-related dimensional changes in the wood occurring over a period of many years. The exterior weathering characteristics of a coating system on a wood substrate are very dependent upon the properties of that part of the system which is in immediate contact with the substrate, and the dispersions of the invention provide particularly suitable primer compositions for application to wood surfaces. None of the NAD's which have previously been described, or which have found successful application in the automotive and industrial markets, have proved suitable for such decorative end-use. The superior weathering properties of the compositions of the invention upon a wood substrate are conveniently demonstrated by means of a so-called "blister-box" test. This test is described in British Standard Specification No. 5082(1974), Appendix C, and consists essentially in coating one surface of a wood panel with the composition under test, overcoating with a conventional alkyd gloss finish and then exposing the uncoated surface of the panel to water vapour and observing the behaviour of the coating as the moisture penetrates through the thickness of the panel. Unsatisfactory coatings exhibit a substantial degree of blister formation and loss of adhesion to the substrate or at the interface between the coatings under these conditions; coatings from the compositions of the invention in contrast exhibit a much reduced tendency to develop these defects. We have found a surprising degree of correlation between the performance of a coating in the "blister-box" test and the gel content of the disperse polymer present in the composition from which it is derived, in that the higher the gel content the less the tendency for blister formation.

The invention is illustrated by the following Examples in which parts and percentages are by weight.

EXAMPLE 1

A. Preparation of Non-Aqueous Dispersion

Into a reaction flask fitted with stirrer, thermometer, inert gas inlet and reflux condenser with provision for feeding ingredients into the returning condensate there was charged:

| High-boiling aliphatic hydrocarbon ("Exsol" D 150/200)* | 468.7 parts |
|---|---|
| Hexane | 294.5 parts |
| Ethanol | 26.4 parts |
| Copolymer stabiliser solution (see below) | 31.4 parts |

*"Exsol" is a Registered Trade Mark of Esso Chemicals Limited.

This charge was heated with stirring to about 50° C., and the following charge was then added:

| Methyl methacrylate | 85.5 parts |
|---|---|
| Acrylic acid | 1.5 parts |
| Azodiisobutyronitrile | 6.9 parts |

The contents of the flask were then heated to reflux temperature (78° C.); once refluxing had become established, the flow of inert gas was discontinued. Within about 30 minutes, a fine dispersion of "seed" polymer had formed. After a further 30 minutes, the dropwise addition into the returning condensate was commenced of the following mixture:

| Methyl methacrylate | 314.5 parts |
|---|---|
| Ethyl acrylate | 1088.0 parts |
| 2-Hydroxyethylacrylate | 80.0 parts |
| Diallyl phthalate | 32.0 parts |
| Azodiisobutyronitrile | 9.9 parts |
| Copolymer stabiliser solution (see below) | 294.9 parts |
| High-boiling aliphatic hydrocarbon ("Exsol" D 150/200) | 468.7 parts |
| Hexane | 294.5 parts |
| Ethanol | 26.4 parts |

On completion of this feed, 5.3 parts of tertiary-butyl-2-ethylhexanoate were added and heating under reflux was continued for a further 1 hour. The resulting polymer dispersion was then subjected to a controlled vacuum so as to remove diluent (490 parts were collected). The dispersion finally obtained had a non-volatile content of 62.6% and a high-shear viscosity of 0.8 poise. The particle size of the dispersion, as measured on the "Nanosizer" (Registered Trade Mark, apparatus marketed by Coulter Electronics Ltd) was 0.57 μm. The gel content of the disperse phase (material insoluble in tetrahydrofuran, determined as described previously) was 69%. The disperse phase polymer had the composition ethyl acrylate 68%, methyl methacrylate 25%, 2-hydroxyethyl acrylate 5%, diallyl phthalate 2%.

When the dispersion was applied to glass and allowed to dry out, a uniform, clear and well coalesced soft film was obtained. The extensibility of the film was 625% when measured by the method of A.S.T.M. D237068.

The copolymer stabiliser solution used in the above Example was a 40% solution in aliphatic hydrocarbon of a graft copolymer prepared by copolymerising in a 1:1 ratio methyl methacrylate and the condensate of equimolar proportions of glycidyl methacrylate and poly(12-hydroxystearic acid) of average molecular weight about 1700.

B. Preparation of Primer/Undercoat Paint for Wood

| | (i) Ingredients | |
|---|---|---|
| I | Non-aqueous dispersion as described above | 10.00 parts |
| | 65% oil length soya alkyd resin | 1.70 parts |
| | White spirit | 6.00 parts |
| II | Fungicide ("Preventol" A4*: Bayer AG) | 0.30 part |
| | Rheology modifier ("Bentone" 34*: NL Chemicals) | 0.25 part |
| | Talc extender | 4.80 parts |
| | Dolomite extender | 18.60 parts |
| | Rutile titanium dioxide | 22.45 parts |
| III | Non-aqueous dispersion as described above | 24.30 parts |
| | Cobalt naphthenate (10% metal) | 0.10 part |
| | Methyl ethyl ketoxime | 0.10 part |
| | Titanium chelate | 0.35 part |
| | Polyamide-modified thixotropic alkyd resin | 8.55 parts |

-continued

| (i) Ingredients | |
|---|---|
| White spirit (to viscosity) | 2.50 parts |
| | 100.00 parts |

*"Preventol" and "Bentone" are Registered Trade Marks.

(ii) Procedure

The equipment used was a "DIAF" high speed disperser.

Ingredients I were charged first to the disperser and stirred at low speed, the ingredients II were then added in the order given. The speed of the disperser was then increased and the mixture stirred for 30 minutes, until the dispersion registered a particle size of 35–40 μm on the Hegman scale. The speed was then reduced for the steady addition of ingredients III. Finally the viscosity was adjusted to 1–7 poise by addition of white spirit, with the aid of the I.C.I. cone and plate viscometer.

(iii) Testing

When applied to a wood substrate at 20° C., the product was touch-dry after 1 hour and could be recoated with itself or with a conventional solvent-borne alkyd resin paint after 4 hours.

When tested according to the method given in BS 5082 (1974) Appendix C (the "Blister Box" test), no blistering occurred.

Sections of joinery with a sharp profile were coated with one coat of the primer/undercoat as described above and one coat of alkyd gloss paint. The panels were then exposed at 45° facing South. After two years the panels were examined and found to be free of all film fault defects such as cracking, flaking or blistering.

COMPARATIVE EXAMPLE

A. Preparation of Non-aqueous Dispersion of Low Gel Content

The procedure described in Example 1(A) was repeated, but with the omission of the diallyl phthalate and replacement of the 2-hydroxyethyl acrylate by the corresponding methacrylate, so that the polymer composition was ethyl acrylate 70%, methyl methacrylate 25%, 2-hydroxyethyl methacrylate 5%. The amount of copolymer stabiliser used in the main feed was reduced from 294.9 parts to 233.5 parts. The final dispersion had a non-volatile content of 61%, but the gel content of the disperse phase (determined as in Example 1) was found to be less than 5%. The dispersion gave a clear, flexible film of extensibility 55% when cast on to a glass panel.

B. Preparation of Primer/Undercoat Paint

The procedure described in Example 1(B) was repeated, with the sole exception that the non-aqueous dispersion of Example 1(A) used therein was replaced by the non-aqueous dispersion described in part A above.

The resulting paint was tested as described in Example 1. The application and drying characteristics of the paint were identical to those of the paint of Example 1. In the test according to B.S. 5082, however, copious blistering of the topcoat occurred. Painted panels exposed to weathering as described in Example 1 showed edge cracking and flaking. The overall performance of the paint was judged to be unsatisfactory.

EXAMPLE 2

A. Preparation of Non-Aqueous Dispersion

The procedure described in Example 1 was repeated, but with the diallyl phthalate crosslinking monomer replaced by allyl methacrylate and the polymer composition adjusted to ethyl acrylate 69.5%, methyl methacrylate 25%, 2-hydroxyethyl acrylate 5% and allyl methacrylate 0.5%.

The final dispersion had a non-volatile content of 59%, a high-shear viscosity of 0.6 poise and a particle size ("Nanosizer") of 0.30 μm. The gel content of the disperse phase was 57%. A good clear film was obtained by casting the dispersion on to a glass panel; its extensibility was 405%.

B. Preparation of a Multi-purpose Primer Paint suitable for use on wood, metal or plaster substrates

| | (i) Ingredients | |
|---|---|---|
| I | Non-aqueous dispersion as described above | 10.30 parts |
| | 65% oil length soya alkyd resin | 1.52 parts |
| | White spirit | 3.00 parts |
| II | Rheology modifier ("Bentone" 34) | 0.25 part |
| | Talc extender | 7.80 parts |
| | Dolomite extender | 30.18 parts |
| | Zinc phosphate | 3.05 parts |
| | Rutile titanium dioxide | 12.96 parts |
| III | Non-aqueous dispersion as described above | 20.00 parts |
| | Cobalt naphthenate (10% metal) | 0.10 part |
| | Methyl ethyl ketoxime | 0.10 part |
| | Titanium chelate | 0.30 part |
| | Polyamide-modified thixotropic alkyd resin | 7.75 parts |
| | White spirit (to viscosity) | 2.69 parts |
| | | 100.00 parts |

(ii) Procedure

The procedure described in Example 1(B)(ii) was followed.

(iii) Testing

The application and testing procedure described in Example 1(B) (iii) was followed.

The paint showed the same application and drying characteristics as the paint of Example 1, and gave similar results to the latter in the B.S. 5082 and weathering tests. In addition, the paint was observed to inhibit the rusting of ferrous metal and it was sufficiently alkali-resistant to be used on plaster substrates.

EXAMPLE 3

Preparation of a White Satin Self-priming Finish for Exterior Woodwork

| | (i) Ingredients | |
|---|---|---|
| I | Non-aqueous dispersion as described in Example 1 | 8.00 parts |
| | 65% oil length soya alkyd resin | 3.00 parts |
| | White spirit | 3.00 parts |
| II | Fungicide ("Preventol" A4) | 0.30 part |
| | Rutile titanium dioxide | 31.20 parts |
| III | Non-aqueous dispersion as described in Example 1 | 42.08 parts |
| | Cobalt naphthenate (10% metal) | 0.1 part |
| | Methyl ethyl ketoxime | 0.1 part |
| | Polyamide-modified thixotropic | 10.90 parts |

-continued

| (i) Ingredients | |
|---|---|
| alkyd resin | |
| White spirit (To viscosity) | 1.32 parts |
| | 100.00 parts |

(ii) Procedure

Ingredients I and II were loaded to a ball mill and dispersed for 8 hours, to give a particle size reading of 15 μm on the Hegman scale. The resulting mill base was let down with ingredients III in the order given and adjusted by addition of white spirit to a viscosity of 1.7 poise with the aid of an ICI cone and plate viscometer.

Two coats of the paint thus obtained, when applied to wood substrates, dried to a high sheen (but not full gloss) finish. When exposed to normal weathering, performance was good with no cracking, flaking or other film faults.

EXAMPLE 4

A. Preparation of Non-aqueous Dispersion The procedure described in Example 1(A) was repeated, but with adjustment of the monomer composition taken so that the polymer had the composition ethyl acrylate 59%, methyl methacrylate 34%, 2-hydroxyethyl acrylate 5% and diallyl phthalate 2%. The dispersion obtained had a solids content of 59% and a high shear viscosity of 0.8 poise; the particle size as measured on the "Nanosizer" was 0.48 μm. The gel content of the disperse phase was 69%. The dispersion was found to be capable of coalescing to produce a clear, fast drying and relatively hard film. The extensibility of the film was 215%.

B. Preparation of Yellow Transparent Woodstain

| (i) Ingredients | | |
|---|---|---|
| Non-aqueous dispersion as described above | 32.78 | parts |
| Rheology modifier ("Bentone" SD1: NL Chemicals) | 1.00 | parts |
| Transparent iron oxide pigment, 40% dispersion ("Sicotrans" Yellow L1915*: BASF) | 4.42 | parts |
| Fungicide ("Traetex" 214*: ACIMA) | 1.00 | part |
| Dimethyl silicone oil (2%) | 1.00 | part |
| Petroleum jelly | 0.12 | part |
| White spirit | 59.68 | parts |

*"Sicotrans" and "Traetex" are Registered Trade Marks.

(ii) Procedure

The ingredients were blended together in the order stated with the aid of a high speed stirrer.

(iii) Testing

Two coats of the resulting wood stain were applied to wood substrates. A low build satin finish was obtained which did not obscure the grain pattern. When the coated substrates were exposed to normal weathering, they performed well with no cracking, flaking or splitting occurring.

EXAMPLE 5

A. Preparation of Non-aqueous Dispersion

The procedure described in Example 1(A) was repeated, except that the diallyl phthalate crosslinking monomer was replaced by the aromatic diacrylate monomer available commercially as "Photomer" 4028 (Registered Trade Mark of Diamond Shamrock Co.) and which is believed to be essentially the diacrylate of bisphenol A. The amounts of the monomers were adjusted to give a polymer composition of ethyl acrylate 61.5%, methyl methacrylate 28%, 2-hydroxyethyl acrylate 10%, "Photomer" 4028 0.5%, and the amount of copolymer stabiliser solution in the main feed was increased from 294.9 parts to 368.6 parts. The final dispersion had a non-volatile content of 61.6%, a high-shear viscosity of 0.8 poise and a particle size ("Nanosizer" determination) of 0.25 μm. The gel content of the disperse phase was 89%. When the dispersion was applied to glass and allowed to dry, a good clear, flexible film was obtained; its extensibility was in excess of 1000%.

B. Preparation of Paint

A primer/undercoat paint for wood was prepared according to the procedure of Example 1(B) except that the dispersion there described was replaced by an equal amount of the dispersion obtained as described in part (A) above. The paint was tested in the same manner as the paint of Example 1(B), with similar results.

EXAMPLE 6

A. Preparation of Non-aqueous Dispersion

The procedure described in Example 1 was repeated, except that the diallyl phthalate was replaced by the trifunctional acrylic monomer known as "Sartomer" SR 351 (Registered Trade Mark of Sartomer Resins Inc.) and which is essentially trimethylolpropane triacrylate. The amounts of monomers were adjusted to give a polymer composition of ethyl acrylate 69.5%, methyl methacrylate 25%, 2-hydroxyethyl methacrylate 5%, "Sartomer" SR 351 0.5%.

The final dispersion had a solids content of 64.7%, a high-shear viscosity of 0.8 poise and a particle size ("Nanosizer") of 0.32 μm. The gel content of the disperse phase was 65%. On spreading the dispersion on to a glass panel and allowing it to dry, a good film, with a slightly hazy appearance, was obtained. Its extensibility was in excess of 1000%.

B. Preparation of Paint

A primer/undercoat for wood was prepared according to the procedure of Example 1(B) except that the dispersion there described was replaced by an equal amount of the dispersion obtained as described in part (A) above. The paint was tested in the same manner as the paint of Example 1(B) with similar results.

EXAMPLE 7

A. Preparation of Non-aqueous dispersion

The procedure described in part A of Example 1 was repeated, with the following differences:
(i) the initial charge had the composition:

| High-boiling aliphatic hydrocarbon ("Exsol" D 150/200) | 485 parts |
|---|---|
| Hexane | 288.3 parts |
| Copolymer stabiliser solution (as in Example 1) | 32.3 parts |

(ii) the first monomer charge added to this consisted of:

| | |
|---|---|
| Methyl methacrylate | 43.5 parts |
| Ethyl acrylate | 43.5 parts |
| 2,2'-Azobis(2-methylbutyronitrile) | 6.9 parts |

(iii) 30 minutes after the formation of the "seed" polymer dispersion, there was added to the reaction mixture dimethlcocodiamine (1.6 parts) and there was then commenced the dropwise addition into the returning condensate of the following monomer mixture:

| | |
|---|---|
| Ethyl acrylate | 1104.7 parts |
| Methyl methacrylate | 313.6 parts |
| Glycidyl methacrylate | 16.0 parts |
| Acrylic acid | 80.0 parts |
| 2,2'-Azobis(2-methylbutyronitrile) | 9.9 parts |
| Copolymer stabiliser solution (as in Example 1) | 302.5 parts |
| High-boiling aliphatic hydrocarbon ("Exsol" D 150/200) | 485.0 parts |
| Hexane | 288.3 parts |

(iv) during the final vacuum stripping step, 486 parts of diluent were collected.

The dispersion thus obtained had a non-volatile content of 58.5% and a high-shear viscosity of 0.7 poise. Determination of particle size gave a result of 0.26 μm. The gel content of the disperse phase was 73.7%. The disperse polymer had the composition ethyl acrylate 71.7%, methyl methacrylate 22.3%, glycidyl methacrylate 1.0%, acrylic acid 5.0%.

When the dispersion was applied to glass and allowed to dry out, a uniform, clear and well coalesced soft film was obtained. The extensibility of the film was 470%.

B. Preparation of Paint

A primer/undercoat paint for wood was prepared according to the procedure of Example 1(B) except that the dispersion there described was replaced by an equal amount of the dispersion obtained as described in part (A) above. The paint gave similar test results to those from the paint of Example 1(B).

We claim:

1. A coating composition in which at least 51% by weight of the film-forming material is present as a sterically stabilised dispersion in a volatile organic liquid of particles having an average diameter in the range 0.1–10 μm of an acrylic or vinyl polymer which is insoluble in that liquid, the polymer having an extensibility as determined by the procedure of A.S.T.M. D2370-68 in the range 50–2000% and being crosslinked to an extent such that the disperse phase has a gel content of at least 35% by weight, and the crosslinking of the polymer is achieved by the inclusion in the monomers which are polymerised to form the polymer either of a difunctional or polyfunctional monomer selected from allyl methacrylate, trimethylolpropane triacrylate, diallyl phthalate and the diacrylate of bisphenol-A, or of a pair of monomers which are mutually coreactive, and are glycidyl acrylate or methacrylate and acrylic or methacrylic acid.

2. A composition as claimed in claim 1, wherein the polymer has an extensibility in the range 100–1000%.

3. A composition as claimed in claim 1, wherein the polymer of the disperse phase has a gel content of at least 50% by weight.

4. A composition as claimed in claim 1, wherein the volatile organic liquid is an aliphatic, or predominantly aliphatic, hydrocarbon.

5. A composition as claimed in claim 4, wherein the sterically stabilised dispersion of polymer particles is obtained by the dispersion polymerisation of the appropriate monomers in the aliphatic, or predominantly aliphatic, hydrocarbon liquid in the presence of an amphipathic polymeric stabiliser one molecular component of which is solvatable by the hydrocarbon liquid and another component of which is relatively non-solvatable by that liquid and is capable of associating with the polymer particles produced.

6. A composition as claimed in claim 5, wherein the polymeric stabiliser is a graft copolymer comprising a backbone which functions as the non-solvatable component and which is an acrylic polymer chain derived predominantly from methyl methacrylate, and a plurality of solvatable polymer chains which are pendant from the backbone and which are residues of poly(12-hydroxystearic acid).

7. A composition as claimed in claim 1, wherein the disperse phase polymer contains autoxidisable groups.

8. A composition as claimed in claim 7, wherein the autoxidisable groups are present in a proportion of from 2% to 20% by weight of the disperse phase.

9. A composition as claimed in claim 1, having a solids content in the range 40% to 70% by weight.

10. A composition as claimed in claim 1, containing in addition to the dispersed, crosslinked polymer a film-forming polymer or resin which is soluble in the volatile organic liquid, the said additional polymer or resin amounting to at most 49% by weight of the total film-forming material present.

11. A composition as claimed in claim 10, wherein the additional polymer or resin amounts to at most 25% by weight of the total film-forming material present.

12. A composition as claimed in claim 10, wherein the additional film-former is an alkyd resin.

13. A substrate to the surface of which there has been applied a coating derived from a composition as claimed in claim 1.

14. A coated substrate as claimed in claim 13, wherein the substrate is of wood.

* * * * *